Dec. 7, 1965 J. L. LANG 3,222,444

METHOD OF PRODUCING PLASTIC ARTICLES

Filed May 28, 1964 3 Sheets-Sheet 1

INVENTOR.
JOHN L. LANG
BY
ATTORNEY

Dec. 7, 1965  J. L. LANG  3,222,444
METHOD OF PRODUCING PLASTIC ARTICLES
Filed May 28, 1964  3 Sheets-Sheet 2
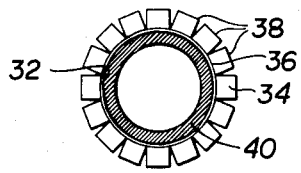
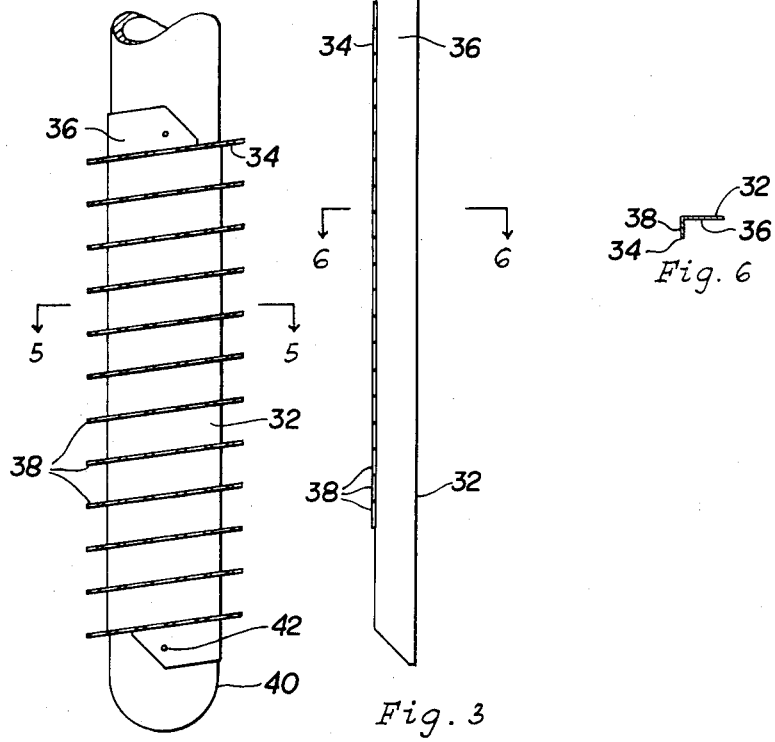
INVENTOR.
JOHN L. LANG
BY
ATTORNEY Dec. 7, 1965 J. L. LANG 3,222,444
METHOD OF PRODUCING PLASTIC ARTICLES
Filed May 28, 1964 3 Sheets-Sheet 3

INVENTOR.
JOHN L. LANG
BY
ATTORNEY

3,222,444
METHOD OF PRODUCING PLASTIC ARTICLES
John L. Lang, 42 Windgate Drive, Box 820–III,
Murrysville, Pa.
Filed May 28, 1964, Ser. No. 370,803
3 Claims. (Cl. 264—317)

This application is a continuation-in-part of my copending application Serial No. 100,482, filed March 28, 1961 and entitled "Method of Producing Plastic Strainer."

This invention relates to the manufacture of substantially rigid plastic articles, and more particularly to a novel method for producing substantially rigid plastic articles having passageways extending therethrough.

The present invention discloses a novel method for producing plastic articles having openings in the surface thereof which are interconnected by means of a network of passageways extending through the plastic article. For example, a plastic strainer or filter may be formed suitable for use in conection with ion exchange water purifiers wherein it is desired to allow water to pass through an ion exchange bed in direct and countercurrent flow while retaining the ion exchange medium on the bed.

As another example of utility, the present method may be used to form a plastic fluid-logic component usable in fluid-digital devices, fluid-analog devices, fluid-analog computers and the like. For example, the method of the present invention may be employed to form fluid-logic components which function as a flip-flop, a NOR gate, an AND gate, an OR gate, and an AND-OR gate and the like. These fluid-logic components are considerably more reliable and considerably less expensive than their analogous electrical circuitry now available. One such fluid-logic component will be described in connection with the drawings accompanying this application.

It is therefore the principal object of the invention to provide a method for producing a substantially rigid plastic article having passageways extending therethrough in a predetermined pattern.

Another object of the invention is to provide a method for producing a substantially rigid plastic strainer capable of preventing movement of ion exchange particles therethrough while allowing water to pass freely.

Another object of the invention is to provide a method for producing a strainer not susceptible of electrolytic deterioration.

Another object of the invention is to provide a method for producing a strainer susceptible of manufacture in an economical and ingenious manner from readily available materials.

Still another object of the invention is to provide a novel method for producing fluid, logic components having an intricate network of passageways extending therethrough.

The invention then consists of a method hereinafter more fully described and particularly pointed out in the claims, the annexed drawings and following description setting forth in detail several modes of carrying out the invention, such disclosed modes illustrating however but several of many ways in which the principles of the invention may be used.

In accordance with the invention I provide a porous skeleton of a desired shape, having at least a portion thereof readily soluble in a solvent which is inert to a suitably selected substantially completely polymerized material. Thereafter, the porous skeleton or element is impregnated with a monomeric or substantially monomeric material, capable of polymerizing to form a substantially rigid polymer insoluble in the aforementioned solvent. The impregnated element then is subjected to conditions which allow the monomeric material to polymerize in situ. The shaped element is then subjected to the action of a suitable solvent whereby to dissolve out a portion of the element to provide a porous plastic strainer. In another embodiment the skeleton may be a continuous section of a soluble material. In a further embodiment, a soluble skeletal structure or mandrel may be formed having a configuration corresponding to the configuration of the passageways which are desired to be formed within the plastic element. Thereafter, a substantially monomeric material is polymerized about the soluble structure to provide a polymeric mass through which and from which the soluble structure extends. The polymeric mass is then subjected to the action of a solvent which will dissolve the soluble structure but not the polymeric mass.

In practice, it has been found generally preferable to employ material capable of polymerizing to form a water insoluble plastic and to use a material readily soluble in water as the soluble portion of the formed element.

The following example, in which a substantially rigid plastic strainer is produced, illustrates a suitable manner for practicing the invention.

*Example*

A mandrel is wrapped with a water soluble foil, e.g., polyvinyl alcohol foil of approximately 10–50 mil thickness and of a shape such that segmented sections project from the mandrel face. Such a shape is readily achieved by first forming the foil in an angle shape and cutting one of the legs at intervals so that as the foil is wrapped about the mandrel, segments of the cut legs project from the mandrel. Thus, if a flat sheet of foil is folded so that an end view of the folded sheet forms a right angle section, for example, and thereafter one leg of the angle section is cut completely through to the other leg, an operation where the uncut leg of foil is wrapped around a mandrel will cause the cut segments of the foil to project outwardly away from the mandrel by virtue of the projecting cut legs opening up at the cuts. The mandrel is placed in a suitable mold and thereafter the polymerizable resin mixture is poured into the mold. The polymerizable polyester mixture might suitably comprise a 40 parts phthalic acid-maleic acid-glycol condensation product dissolved in 60 parts monomeric styrene. The styrene polyester mixture gives a fluid mixture. The phthalic acid-maleic acid-glycol condensation product dissolved in the correct amount of styrene may be purchased commercially. A suitable catalyst such as methylethyl ketone peroxide in a suitable solvent such as dimethyl phthalate is added in an amount of approximately 0.25% and the mixture is heated to 40–50° C. for from 1 to 2 hours. After the mixture is polymerized, the formed element is subjected to the action of water and the water soluble foil dissolves. If a closely controlled mold size is employed it will be unnecessary to remove the surface of the polymerized plastic to expose the foil to the action of the solvent. Alternatively, the surface of the mold may be coated with a water soluble material such as gelatin whereby the foil is enabled to more completely project through the surface after polymerization has taken place and this produces later ready contact with the solvent. In this latter instance, the surface of the formed element need not be cut down or reduced in diameter to expose the foil to dissolution.

Alternatively, the mold may be dispensed with and the polymerizable mixture sprayed directly on the mandrel using a mixture having an accelerated polymerization rate produced by additionally catalyzing the mixture with a cobalt compound such as cobalt octoate and/or heat or actinic light. The polymerization rate can be increased to the extent that continuous spraying can be effected to produce the desired wall thickness.

In the drawings:

FIG. 3 is a side showing the water soluble foil bent at right angles and cut completely through at one leg of the angle at intervals preparatory to winding on the mandrel;

FIG. 4 is a side elevation of the foil shape of FIG. 3 wrapped on a mandrel preparatory to placement in the mold and filling with the polymerizable resin mixture;

FIG. 5 is a view taken along line 5—5 of FIG. 4;

FIG. 6 is a cross-sectional view taken along the line 6—6 of FIG. 3;

Figures 1, 2:
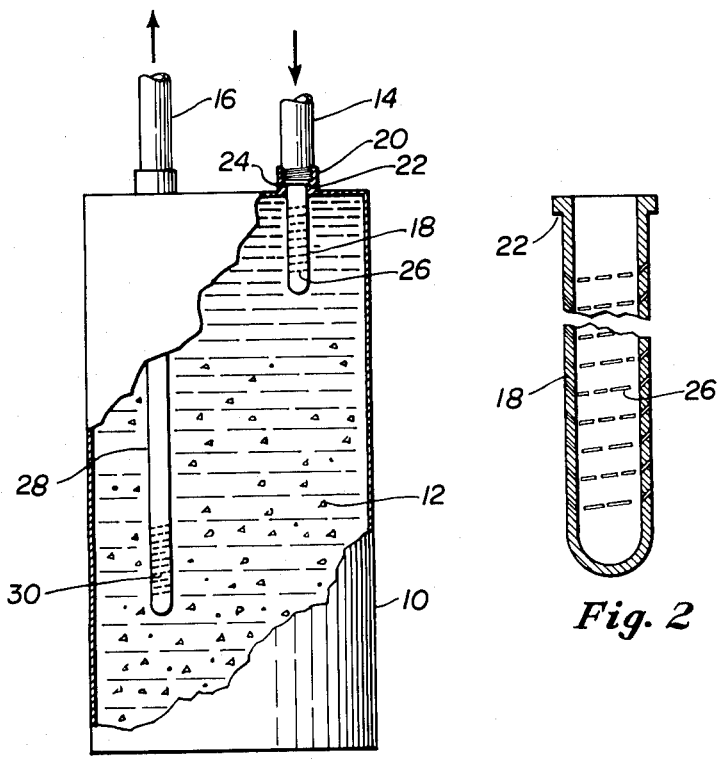
FIGURE 1 is the side elevation, in section, of the conventional water softening unit.
FIG. 2 is an enlarged cross-sectional view of the strainer made in accordance with the invention.

Referring to FIG. 1, a tank 10 containing a water softening chemical 12 is provided at the top with a water inlet 14 and a water outlet 16. A plastic strainer 18 is shown seated in a metal coupling 20 surrounding the lower end of the water inlet 14 and is held in place by virtue of a shoulder 22 on the plastic strainer 18 seated on a complementary shoulder 24 provided on the coupling 20. The inlet pipe 24 screws down against the annular shoulder 22 of the plastic strainer 18 to securely hold it in place. As shown, the plastic strainer 18 is provided with slots 26 through which water flows into the tank 10. An extension plastic dip pipe 28 is secured to the outlet pipe 16 in the manner just described in connection with the plastic strainer 18 and water inlet 14. The lower end of the plastic dip pipe 28 is slotted at 30 to provide for water flow therethrough and out of the tank 10.

FIG. 2 is an enlarged view of the plastic strainer 18 illustrating the annular shoulder 22 and the slotted openings 26 in greater detail.

FIGS. 3 and 6 illustrate another embodiment of the invention wherein a water soluble foil strip 32 has been folded to form a right angle section having leg members 34, 36 best shown in FIG. 6. The leg 34 is cut at intervals to provide a plurality of projecting segments 38.

Thereafter, as illustrated in FIGS. 4 and 5, if the uncut leg 36 of the soluble foil strip 32 is spirally wound upon a mandrel 40, the cut segments 38 will project away from the mandrel 40 and provide passages through the subsequently formed strainer upon polymerization of the resin in a suitable mold and subsequent solution of the cut foil segments 38 and the uncut foil leg 36. The foil strip 32 may be secured to the surface of the mandrel 40 during the wrapping operation in any one of several ways, as for example, by pinning or riveting as at 42 or by using strips of adhesive tape.

Figure 7:
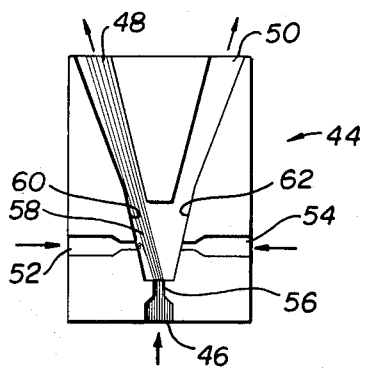
FIG. 7 is a view schematically illustrating a fluid-logic component which may be readily made in accordance with the principles of the present invention.

As mentioned above, the present method is especially useful in forming fluid-logic components which are used in fluid computers. An example of a fluid-logic component is illustrated in FIG. 7 and generally designated by the numeral 44. The component 44 serves as a flip-flop device and includes a power input opening 46, a first and second output openings 48, 50, a set input opening 52 and a reset input opening 54. A fluid such as water or air is introduced into the power input opening 46 and through a nozzle 56. As illustrated in FIG. 7, a jet 58 is shown issuing from a nozzle 56. The jet 58 has attached itself to the left wall 60 whereby the jet communicates to the first output opening 48. The jet 58 attaches itself to the left wall 60 by the well-known "Coanda effect." As is known, the Coanda effect occurs when a jet of fluid is expelled near an inclined adjacent flat or curved plate. As the fluid rushes past the inclined wall, fluid is evacuated near the plate causing the formation of a vortex or bubble of fluid at low pressure and the establishment of a transverse pressure gradient along the jet which bends the jet over toward the plate as it proceeds downstream.

In the component 44 illustrated in FIG. 7, an output signal is presently at the first output opening 48. When an output signal is desired at the second output opening 50, the fluid is pulsed through the set input opening 52 causing a breakdown of the Coanda effect and serving to displace the jet 58 toward and adjacent to the right wall 62 where the Coanda effect is reestablished to attach the jet 58 to the right wall 62. At this time, an output signal will appear at the second output opening 50. To reestablish the output signal at the first output opening 48, fluid is pulsed through the reset input opening 54 causing the jet 58 to be displaced toward and adjacent to the left wall 60.

The component 44 is but one of many fluid-logic components which are used to build a fluid-logic computer. For example, other fluid-logic components may be formed to serve as a NOR gate, an AND gate, an OR gate, an AND-OR gate and the like, which components are similar to and could replace electronic and elecromechanical devices and systems in a number of applications.

Figure 8:
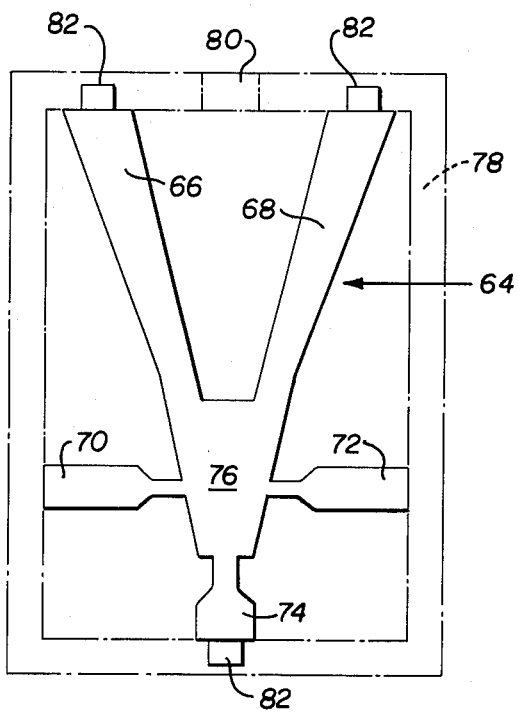
FIG. 8 is an elevation view illustrating a soluble skeletal structure employed in making the fluid-logic component of FIG. 7.

These fluid-logic components may be conveniently formed by the method of the present invention. Hence, as illustrated in FIG. 8, a soluble skeletal structure 64 is formed having a configuration corresponding to the configuration of the passageways which are desired to be formed within the fluid-logic component. For example, the soluble skeletal structure 64 corresponds in configuration with the configuration of the passageways in the fluid-logic component 44 of FIG. 7. The soluble skeletal structure 64 includes diverging arms 66, 68 corresponding to the passageways leading to the first and second output openings 48, 50; oppositely-extending arms 70, 72 corresponding to the passageways of the component 44 leading to the set and reset input openings 52, 54; a lower arm 74 corresponding to the passageway in component 44 leading to the power input opening 46; and a central body portion 76 the sides of which correspond to the right and left walls 60, 62 of the component 44 of FIG. 7.

Figure 9:
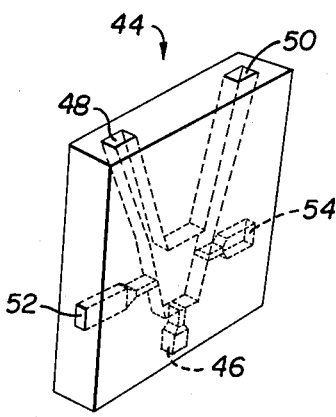
FIG. 9 is an isometric view illustrating the completed fluid-logic component as made from the skeletal structure illustrated in FIG. 8.

The soluble skeletal structure 64 is placed in a suitable mold schematically illustrated herein by the dash-dot outline 78. Thereafter, a monomeric or substantially monomeric material is poured into the mold through a pour opening 80 provided in the mold 78. The substantially monomeric material is caused to polymerize to form a substantially rigid plastic as heretofore described. Thereafter, the polymeric mass is subjected to the action of a solvent which will dissolve the soluble skeletal structure but not the polymeric mass. The soluble skeletal structure 64 preferably is provided with studs 82 which serve first to position the structure 64 within the mold and second to provide portions which are immediately subject to the action of the solvent for dissolving the skeletal structure 64. It should be quite evident that extremely complicated fluid-logic components may be produced. Further, the dimensions of the various passageways and walls may be maintained within the required tolerances. The completed fluid-logic component 44 is illustrated in FIG. 9.

It should be evident that by means of the present method other fluid-logic components may be formed which have exceedingly more intricate internal passageways. Further, each of the above-enumerated gates may be formed individually or may be combined as desired. Consequently, the present method provides an exceedingly simple means by which these complicated fluid-logic components may be formed.

Among other polymerizable materials capable of polymerizing to give a coherent substantially rigid mass might be mentioned admixtures of unsaturated polyesters together with vinyl aromatic compounds, vinyl halides, vinyl esters, vinyl ethers, vinylidene halides, acrylic esters, alpha-substituted lower alkyl acrylic esters, alpha-halo acrylic esters, and the like. Another polymerizable mixture suitable for the purpose at hand comprises a phthalic acid-maleic acid-glycol, condensation product previously described admixed with tri-allyl-cyanurate. By way of example a suitable mixture may contain approximately 60% by weight of the Selectron 5003 and 40% by weight of the tri-allyl-cyanurate. The mixture may be catalyzed by the addition of a small amount of methyl ethyl ketone peroxide and cobalt octoate. Phenolic casting resins may also be suitably used. Additionally substantially rigid resin forming materials, consisting of tri-allyl-cyanurate and a maleic alkyd resin, or tri-allyl-cyanurate alone may be employed in the method of the invention.

It will be understood that if desired reinforcing agents may be incorporated in the plastic structure, such as for example, glass fibers, cotton flocks, canvas and the like.

I claim as my invention:

1. In a method of producing a substantially rigid plastic strainer the steps which comprise wrapping a mandrel with a soluble foil having elements projecting away from the mandrel, placing the so wrapped mandrel in a suitable mold such that the soluble elements projecting away from the mandrel extend to the surface of the mold, filling the mold with a substantially monomeric material capable of polymerizing to a rigid resin, polymerizing said monomer in situ to form a polymerized tubular element through which the soluble elements extend, and thereafter withdrawing the mandrel and subjecting the so-formed article to the action of a solvent which will dissolve the foil but not the formed article to provide radially-extending openings in the polymerized tubular element.

2. In a method of making a substantially rigid plastic article having openings passing therethrough, the steps which comprise wrapping a form over at least a portion of its surface with a soluble foil having segmented elements projecting from the surface of the form, polymerizing a substantially monomeric material about the form to provide a polymeric mass with the segmented elements projecting through the polymerized mass from face to face and thereafter subjecting the so-formed article to the action of a solvent which will dissolve the foil but not the polymerized mass.

3. In a method of making a substantially rigid plastic, fluid-logic component, the steps which comprise forming a soluble skeletal mandrel having a plurality of integral branch arms disposed in a preselected spatial arrangement, placing said soluble skeletal mandrel in a suitable mold, filling said mold with a substantially monomeric material capable of polymerizing to a rigid plastic, polymerizing said monomer in situ to form a polymerized element through which said soluble skeletal mandrel extends and subjecting said polymerized element to an action which will dissolve said soluble skeletal mandrel but not said polymerized element, thereby producing a fluid-logic component having a plurality of input openings, output openings and passageways left upon the dissolution of said skeletal mandrel and which are disposed in said preselected spatial arrangement.

References Cited by the Examiner

UNITED STATES PATENTS

| | | |
|---|---|---|
| 1,554,697 | 11/1925 | Alden. |
| 2,474,201 | 8/1949 | Raymond. |
| 3,140,327 | 7/1964 | Dettmer _____ 264—317 |

ROBERT F. WHITE, *Primary Examiner.*